(12) United States Patent
Xu et al.

(10) Patent No.: US 12,464,456 B2
(45) Date of Patent: Nov. 4, 2025

(54) CONNECTED DISCONTINUOUS RECEPTION FOR CARRIER AGGREGATION

(71) Applicant: Apple Inc., Cupertino, CA (US)

(72) Inventors: Fangli Xu, Beijing (CN); Yuchul Kim, San Jose, CA (US); Haitong Sun, Cupertino, CA (US); Wei Zeng, Saratoga, CA (US); Dawei Zhang, Saratoga, CA (US); Haijing Hu, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 495 days.

(21) Appl. No.: 17/765,542

(22) PCT Filed: Oct. 15, 2019

(86) PCT No.: PCT/CN2019/111223
§ 371 (c)(1),
(2) Date: Mar. 31, 2022

(87) PCT Pub. No.: WO2021/072628
PCT Pub. Date: Apr. 22, 2021

(65) Prior Publication Data
US 2022/0346008 A1  Oct. 27, 2022

(51) Int. Cl.
*H04W 52/02* (2009.01)
*H04W 76/28* (2018.01)

(52) U.S. Cl.
CPC ... *H04W 52/0216* (2013.01); *H04W 52/0235* (2013.01); *H04W 76/28* (2018.02)

(58) Field of Classification Search
CPC ............. H04W 52/146; H04W 52/365; H04W 52/367; H04W 52/343; H04W 74/004;
(Continued)

(56) References Cited

U.S. PATENT DOCUMENTS 9,374,203 B2 * 6/2016 Kim ..................... H04L 5/001
9,635,621 B2 * 4/2017 Papasakellariou .... H04L 1/1812
(Continued)

FOREIGN PATENT DOCUMENTS

CN    102215552 A    10/2011
CN    104581908 A    4/2015
(Continued)

OTHER PUBLICATIONS

L. Sharma, B. B. Kumar and S.-L. Wu, "Performance Analysis and Adaptive DRX Scheme for Dual Connectivity," in IEEE Internet of Things Journal, vol. 6, No. 6, pp. 10289-10304, Dec. 2019, doi: 10.1109/JIOT.2019.293734 (Year: 2019).*

(Continued)

*Primary Examiner* — William D Cumming
(74) *Attorney, Agent, or Firm* — Kowert, Hood, Munyon, Rankin & Goetzel, P.C.

(57) ABSTRACT

Apparatuses, systems, and methods for supporting multiple discontinuous reception configurations in a carrier aggregation scenario in a wireless communication system. An indication that a wireless device supports multiple discontinuous reception configurations for carrier aggregation operation may be provided by the wireless device to a cellular base station. Configuration information for carrier aggregation operation may be received by the wireless device from the cellular base station. The configuration information may include separate discontinuous reception configurations for each of multiple cell groups.

20 Claims, 16 Drawing Sheets

(58) Field of Classification Search
CPC . H04W 72/23; H04W 76/15; H04W 72/0573; H04W 52/34
USPC ................................................. 370/311, 329
See application file for complete search history.

(56) References Cited

U.S. PATENT DOCUMENTS

| | | | |
|---|---|---|---|
| 9,730,258 B2* | 8/2017 | Davydov | H04L 1/0029 |
| 9,763,199 B2* | 9/2017 | Pelletier | H04W 52/365 |
| 9,854,568 B2* | 12/2017 | Chen | H04W 72/23 |
| 9,888,465 B2* | 2/2018 | Papasakellariou | H04L 5/0094 |
| 10,070,426 B2* | 9/2018 | Yang | H04L 1/1812 |
| 10,271,288 B2* | 4/2019 | Pelletier | H04W 52/367 |
| 10,420,028 B2* | 9/2019 | Rahman | H04W 76/15 |
| 10,506,652 B2* | 12/2019 | Davydov | H04L 1/0029 |
| 10,542,499 B2* | 1/2020 | Pelletier | H04W 72/0473 |
| 10,966,165 B2* | 3/2021 | Papasakellariou | H04W 52/34 |
| 11,166,331 B2* | 11/2021 | Davydov | H04W 24/10 |
| 11,240,789 B2* | 2/2022 | Papasakellariou | H04L 5/0094 |
| 11,290,961 B2* | 3/2022 | Pelletier | H04W 52/365 |
| 11,432,237 B2* | 8/2022 | Yu | H04W 52/0216 |
| 11,576,122 B1* | 2/2023 | Cheng | H04W 52/0216 |
| 11,582,784 B2* | 2/2023 | Tsai | H04L 5/001 |
| 11,611,419 B2* | 3/2023 | Yang | H04L 1/1861 |
| 11,799,612 B2* | 10/2023 | Yang | H04L 1/1614 |
| 11,856,523 B2* | 12/2023 | Pelletier | H04W 52/367 |
| 11,985,596 B2* | 5/2024 | Yi | H04W 52/0229 |
| 12,016,041 B2* | 6/2024 | Tsai | H04L 5/0098 |
| RE50,037 E* | 7/2024 | Kim | H04W 56/0045 |
| 12,232,040 B2* | 2/2025 | Cheng | H04W 52/0235 |
| 2004/0257677 A1 | 12/2004 | Matsusaka | |
| 2007/0070525 A1 | 3/2007 | Taniyama | |
| 2011/0267955 A1 | 11/2011 | Dalsgaard | |
| 2013/0058240 A1 | 3/2013 | Kim | |
| 2015/0208366 A1* | 7/2015 | Papasakellariou | H04L 1/1812 370/311 |
| 2015/0215944 A1 | 7/2015 | Kim | |
| 2015/0253647 A1 | 9/2015 | Mercado | |
| 2016/0100447 A1* | 4/2016 | Chen | H04W 74/004 370/329 |
| 2016/0142191 A1* | 5/2016 | Davydov | H04L 1/0029 370/329 |
| 2016/0286603 A1 | 9/2016 | Vajapeyam et al. | |
| 2016/0295561 A1* | 10/2016 | Papasakellariou | H04W 72/23 |
| 2017/0013565 A1* | 1/2017 | Pelletier | H04W 52/365 |
| 2017/0230914 A1* | 8/2017 | Papasakellariou | H04W 52/0212 |
| 2017/0245320 A1 | 8/2017 | Heo et al. | |
| 2017/0367045 A1* | 12/2017 | Rahman | H04W 76/15 |
| 2018/0014255 A1* | 1/2018 | Pelletier | H04W 52/365 |
| 2018/0092149 A1* | 3/2018 | Davydov | H04W 24/10 |
| 2018/0160413 A1* | 6/2018 | Papasakellariou | H04L 1/0045 |
| 2019/0150103 A1* | 5/2019 | Papasakellariou | H04L 1/1812 370/329 |
| 2019/0253978 A1* | 8/2019 | Pelletier | H04W 52/367 |
| 2020/0120596 A1* | 4/2020 | Yu | H04W 52/0216 |
| 2020/0163143 A1* | 5/2020 | Davydov | H04L 1/0029 |
| 2020/0245257 A1* | 7/2020 | Pelletier | H04W 72/0473 |
| 2021/0051698 A1* | 2/2021 | Tsai | H04W 72/23 |
| 2021/0219245 A1* | 7/2021 | Papasakellariou | H04W 28/18 |
| 2022/0182947 A1* | 6/2022 | Pelletier | H04W 72/0473 |
| 2022/0210739 A1* | 6/2022 | Yi | H04L 5/0037 |
| 2022/0303100 A1* | 9/2022 | Yang | H04L 1/1671 |
| 2022/0303961 A1* | 9/2022 | Wu | H04W 72/23 |
| 2022/0346008 A1* | 10/2022 | Xu | H04L 5/001 |
| 2022/0353817 A1* | 11/2022 | Cheng | H04W 52/028 |
| 2022/0408515 A1* | 12/2022 | Li | H04W 52/0216 |
| 2023/0015820 A1* | 1/2023 | Tsai | H04L 5/0053 |
| 2023/0018952 A1* | 1/2023 | Wu | H04W 74/0866 |
| 2023/0040436 A1* | 2/2023 | Cheng | H04W 52/0216 |
| 2023/0042702 A1* | 2/2023 | Kim | H04W 24/02 |
| 2023/0163926 A1* | 5/2023 | Yang | H04L 1/1671 370/329 |
| 2023/0422336 A1* | 12/2023 | Chen | H04W 76/15 |
| 2024/0064652 A1* | 2/2024 | Pelletier | H04W 52/365 |
| 2024/0215106 A1* | 6/2024 | Elazzouni | H04L 5/0005 |
| 2024/0224183 A1* | 7/2024 | Zorgui | H04W 52/0232 |

FOREIGN PATENT DOCUMENTS

| | | | | |
|---|---|---|---|---|
| CN | 113382459 A | * | 9/2021 | ........ H04W 52/0216 |
| CN | 114246002 A | * | 3/2022 | ............ H04L 5/001 |
| CN | 114451018 A | * | 5/2022 | .......... H04W 72/044 |
| CN | 114557049 A | * | 5/2022 | ............ H04L 5/001 |
| CN | 115150911 A | * | 10/2022 | ............ H04W 36/06 |
| CN | 114451018 B | * | 8/2024 | .......... H04W 72/044 |
| EP | 4114092 A1 | * | 1/2023 | ........ H04W 52/0216 |
| JP | 2013-530636 | | 7/2013 | |
| JP | 2016-077007 | | 5/2016 | |
| WO | 2010128909 A1 | | 11/2010 | |
| WO | 2014172306 | | 10/2014 | |
| WO | 2016180463 | | 11/2016 | |

OTHER PUBLICATIONS

Extended European Search Report for EP Patent Application No. 19949052.5; 11 pages; Jul. 29, 2022.
Samsung "On UE adaptation Schemes"; 3GPP TSG RAN WG1 Ad-Hoc Meeting 1901 R1-1901087; Taipei Taiwan; 13 pages; Jan. 12-15, 2019.
QUALCOM Inc "UE Adaptation to the Traffic and UE Power Consumption Characteristics"; 3GPP TSG-RAN WG1 Ad-Hoc Meeting 1401 R1-1900911; Taipei, Taiwan; 24 pages; Jan. 21-25, 2019.
Ericsson et al. "cDRX enhancement for CA"; 3GPP TSG RAN WG2#107bis R2-1913196; Oct. 14, 2019.
QUALCOMM et al. "Cross cell group wakeup message in MR-DC"; 3GPP TSG RAN WG2#107bis R2-1913900; Oct. 14, 2019.
Ericsson et al. "Returning multiple BC+FS in CG Config"; 3GPP TSG RAN WG2#107bis R2-1913528; Oct. 14, 2019.
Office Action for JP Pat. Application No. 2022-522023; Mar. 23, 2023.
Examination Report from European Patent Application No. 17715892. 0, dated Jul. 21, 2023, pp. 1-5.
Warren J. Smith, "Modern Lens Design," In: "Modern Lens Design", Genesse Optics Software Inc., Jan. 1, 1992, McGraw-Hill, Inc., XP055152035, ISBN: 978-0-07-059178-3, pp. 25-27.
First Examination Report for IN Patent Application No. 202217021044; 5 pages; Oct. 19, 2022.
Action for JP Patent Application No. 2022-522023; Jul. 3, 2023.
International Search Report and Written Opinion for PCT/CN2019/111223; 9 pages; Jul. 15, 2020.

* cited by examiner

CONNECTED DISCONTINUOUS RECEPTION FOR CARRIER AGGREGATION

PRIORITY CLAIM

This application is a national phase entry of PCT application number PCT/CN2019/111223, entitled "Connected Discontinuous Reception for Carrier Aggregation," filed Oct. 15, 2019, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless devices, and more particularly to apparatus, systems, and methods for supporting multiple discontinuous reception configurations in a carrier aggregation scenario in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods for supporting multiple discontinuous reception configurations in a carrier aggregation scenario in a wireless communication system.

According to the techniques described herein, a wireless device may provide an indication to a cellular base station that it can support multiple discontinuous reception configurations in conjunction with carrier aggregation operation.

The cellular base station may configure the wireless device for carrier aggregation operation. The carrier aggregation configuration may include provision of multiple cells (e.g., deployed on different, adjacent or separated, frequencies) to a wireless device. The cells provided may be used to support concurrent (or substantially concurrent) connections with multiple nodes of the same generation (e.g., fifth generation new radio (5G NR) network nodes) of cellular communication technology, or of different generations (e.g., 5G NR and LTE) of cellular communication technology, for example in a dual connectivity cellular communication configuration, among various possibilities.

The cellular base station may provide multiple discontinuous reception configurations in conjunction with the carrier aggregation configuration, based at least in part on the indication that the wireless device can handle the multiple discontinuous reception configurations. The multiple discontinuous reception configurations could include different discontinuous reception configurations for different cells, different frequency ranges, different groups of cells, etc. The wireless device and the cellular base station may communicate via multiple component carriers in accordance with the multiple discontinuous reception configurations.

Using the techniques described herein may reduce the power consumption of wireless devices when performing carrier aggregation based cellular communication, possibly with minimal or no loss of throughput and/or network scheduling flexibility, at least in some embodiments.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
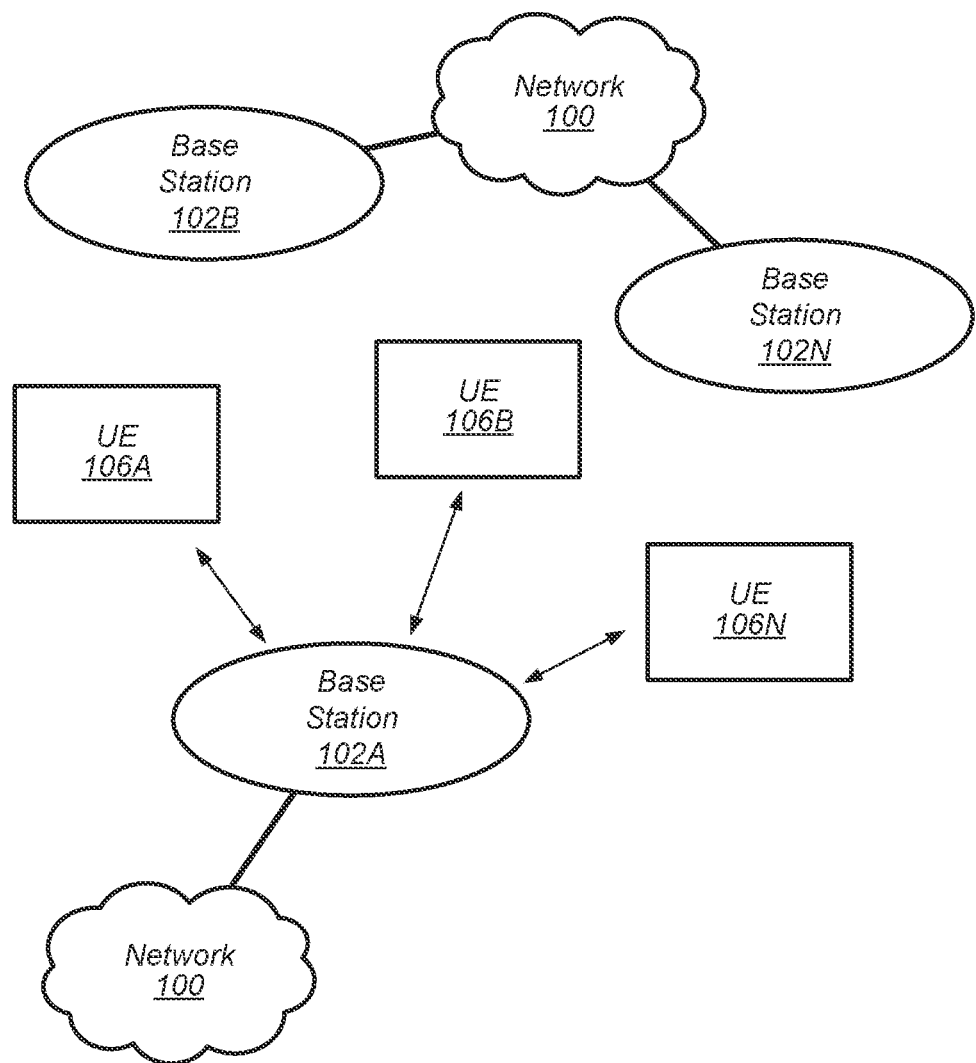
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth™ channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
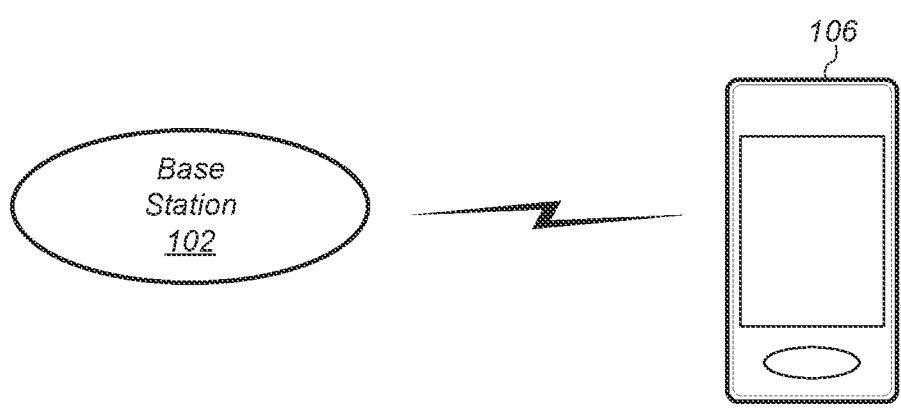
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1xRTT, 1xEV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth™, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth™. Other configurations are also possible.

Figure 3:
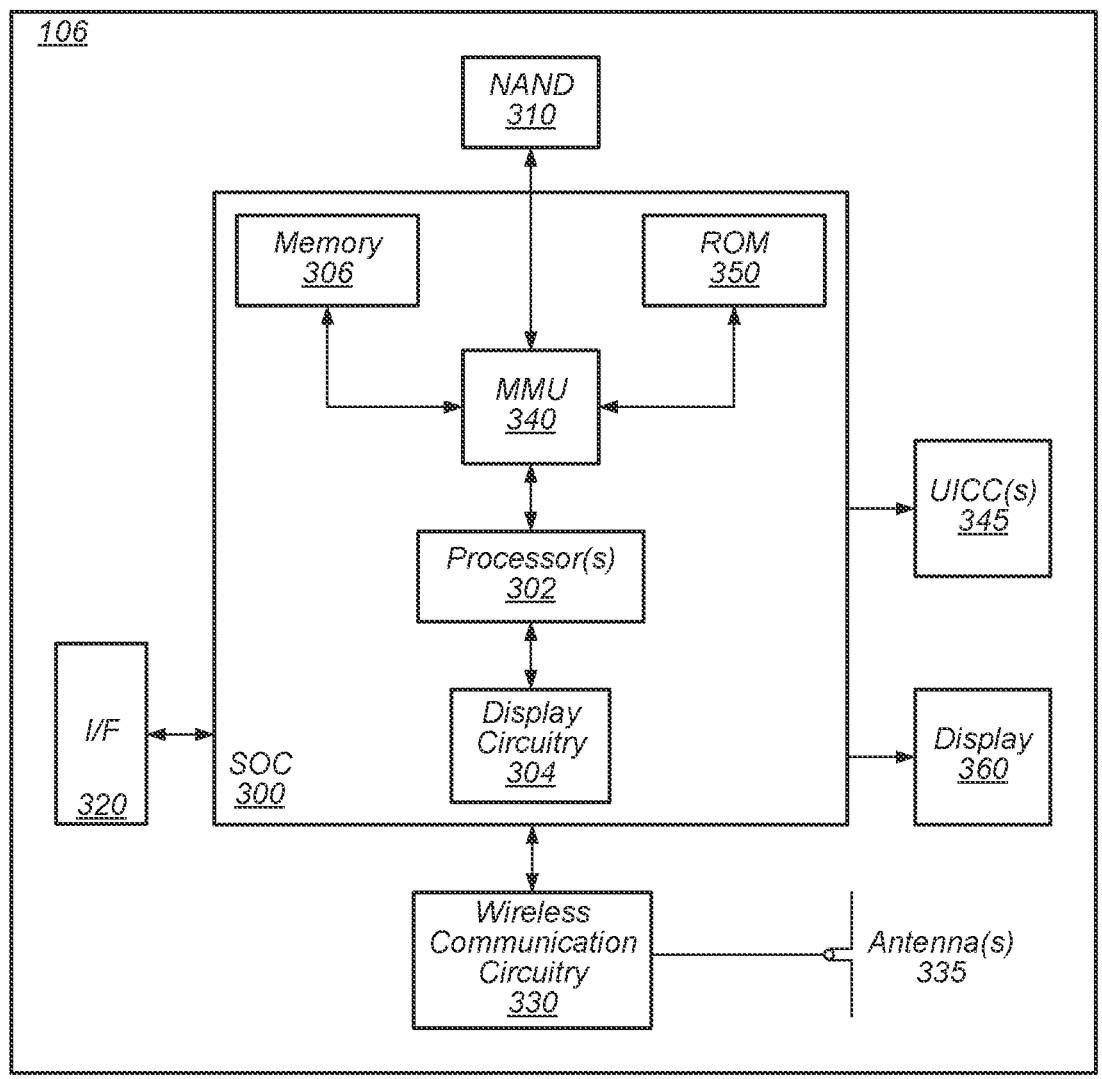
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth™, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
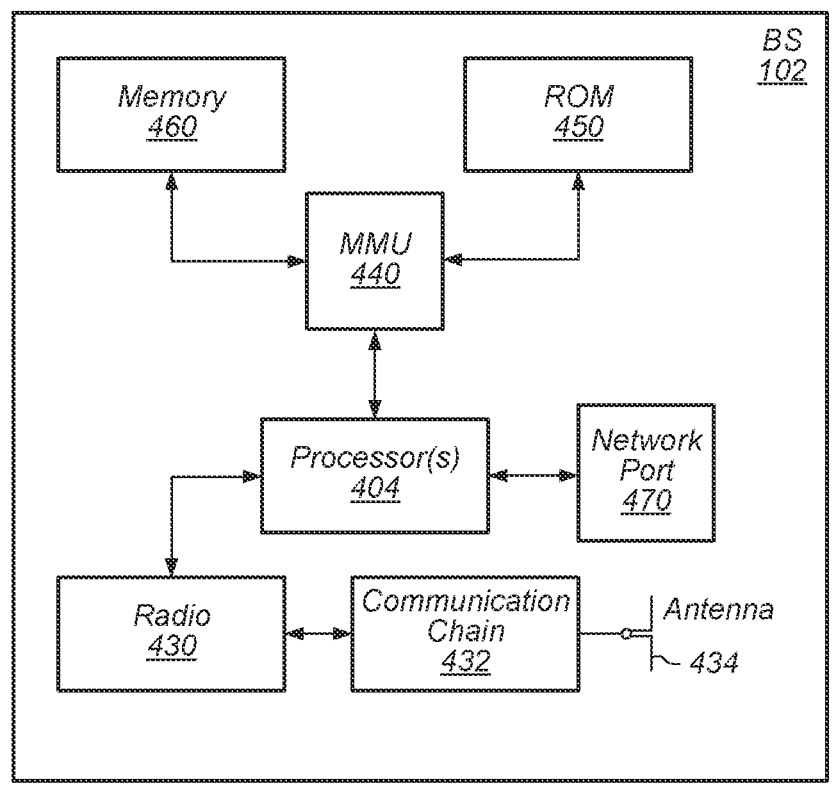
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
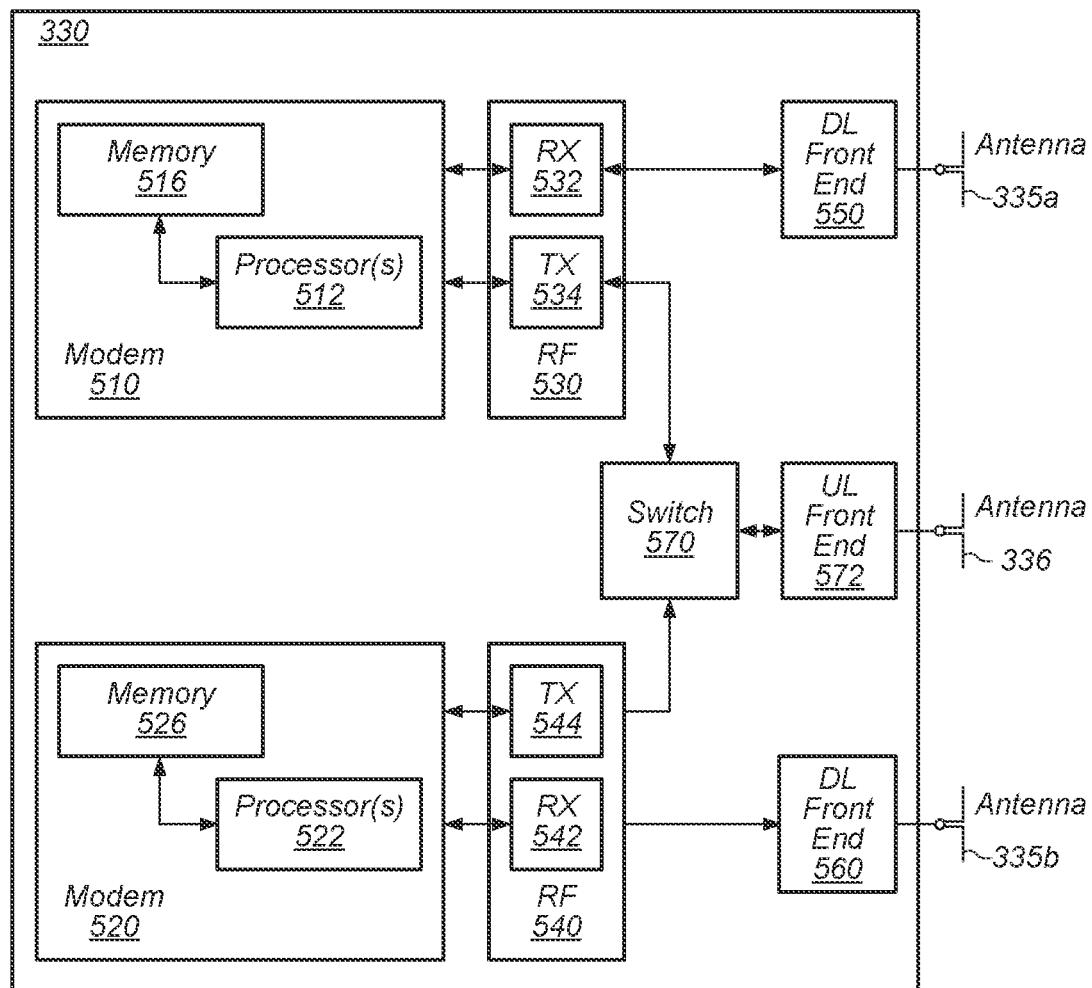
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some embodiments, the cellular communication circuitry 330 may also not include the switch 570, and the RF front end 530 or the RF front end 540 may be in communication, e.g., directly, with the UL front end 572.

Figure 6:
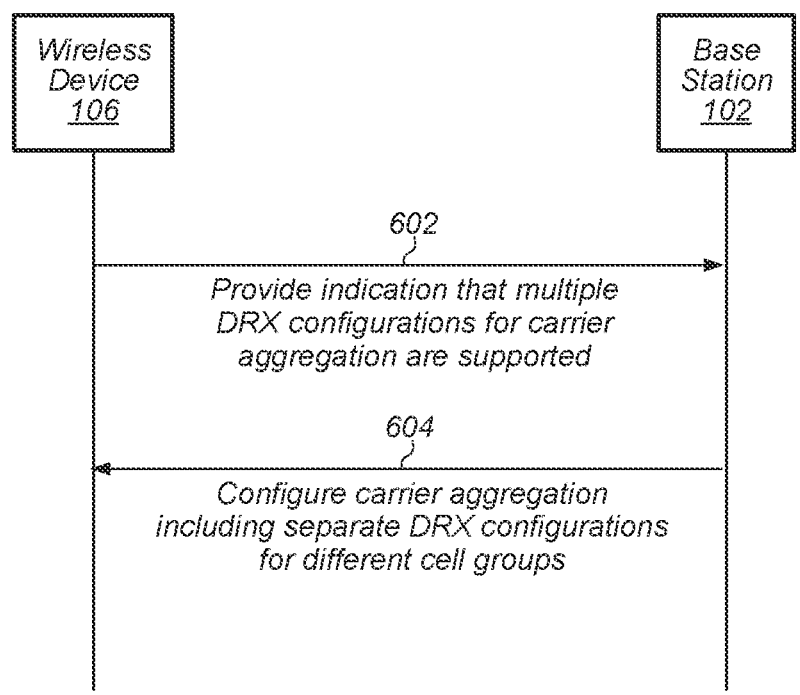
FIG. 6 is a flowchart diagram illustrating an example method for supporting multiple discontinuous reception configurations in a carrier aggregation scenario in a wireless communication system, according to some embodiments.

FIG. 6—Multiple DRX Configurations for Carrier Aggregation Operation

New cellular communication techniques are continually under development, to increase coverage, to better serve the range of demands and use cases, and for a variety of other reasons. One cellular communication technique that may be used to provide additional communication bandwidth and/or for any of a variety of other reasons may include carrier aggregation. In some instances, a carrier aggregation configuration may include a scenario in a wireless device is configured by a cellular network to utilize multiple cells (e.g., a primary or master cell (PCell) and one or more secondary cells (SCells). The cells provided may operate according to the same RAT, according to some embodiments. As another possibility, the cells provided may include cells that operate according to different RATs, for example in a dual connectivity scenario.

Another cellular communication technique that can be used may include discontinuous reception or DRX. DRX may include operating according to a set of DRX parameters to periodically monitor a control channel (or multiple control channels) for downlink signaling, and to operate in a low/reduced power state between control channel monitoring opportunities. DRX may be used while in RRC connected mode (which may be referred to as connected DRX or CDRX), in RRC idle mode (which may be referred to as idle DRX or IDRX), and/or in various other possible scenarios, according to various embodiments.

If carrier aggregation and DRX are both configured for a wireless device, it may be the case that the DRX configuration is applied across all of the configured component carriers. However, such an approach may result in unnecessary power consumption by the wireless device, at least in some instances. For example, in situations in which scheduling periods for different component carriers have different lengths (e.g., temporally), the wireless device might remain awake on the component carrier with the shorter scheduling period even after the end of the scheduling period. Accordingly, it may be beneficial, at least in some instances, to support the use of multiple (e.g., different) DRX configurations for different cell groups of a carrier aggregation configuration.

FIG. 6 is a signal flow diagram illustrating an example of such a method for using multiple DRX configurations as part of carrier aggregation operation, at least according to some embodiments. Aspects of the method of FIG. 6 may be implemented by a wireless device such as a UE 106 illustrated in various of the Figures herein, a base station such as a BS 102 illustrated in various of the Figures herein, and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

In various embodiments, some of the elements of the methods shown may be performed concurrently, in a different order than shown, may be substituted for by other method elements, or may be omitted. Additional elements may also be performed as desired. As shown, the method of FIG. 6 may operate as follows.

At 602, the wireless device may provide an indication to the cellular base station that the wireless device can support multiple DRX configurations for carrier aggregation. According to some embodiments, the indication may be provided in wireless device capability information. The indication may indicate support (or lack of support) for any or all of various DRX related features, such as separate DRX configurations for different cell groups, separate specific DRX parameters for different cell groups, per cell group indications to enter a DRX off state (and/or other per cell group DRX related commands), cross cell group control channel monitoring control, scheduling scheme switching capabilities, etc. In some embodiments, support (or lack of support) for a group of multiple DRX configuration related features may be indicated together (e.g., with a single 1 bit flag, or in any of various other possible ways). Additionally or alternatively, indication of support (or lack of support) for some or all multiple DRX configuration related features may be provided individually (e.g., with a 1 bit flag for each feature for which support or lack of support is indicated).

In 604, the cellular base station may configure the wireless device for carrier aggregation operation. The configuration may include separate DRX configurations for different cell groups, e.g., based at least in part on the indication of support for multiple DRX configurations received from the wireless device. For example, the cellular base station may provide a "first" DRX configuration for a "first" cell group, as well as a "second" DRX configuration for a "second" cell group, where one or more DRX parameters may differ between the first DRX configuration and the second DRX configuration.

The cell groups may each include at least one cell, and possibly multiple cells. In some instances, the different cell groups may include cells that are in different frequency ranges. For example, the first cell group could include at least one cell that is in a first frequency range (e.g., 3GPP FR1), while the second cell group could include at least one cell that is in a second frequency range (e.g., 3GPP FR2). At least in some instances, the first frequency range and the second frequency range may be non-contiguous.

The DRX configurations may include indications of various DRX parameters for each configured DRX cell group. For example, the DRX configurations may indicate inactivity timer values, on duration timer values, short DRX cycle values, short DRX timer values, long DRX cycle values, hybrid automatic repeat request (HARQ) round trip time (RTT) timer values and/or retransmission timer values, and/or any of various other possible parameters, any or all of which may differ between the first DRX configuration and the second DRX configuration, as desired.

The wireless device may determine whether to operate in a DRX on or DRX off state independently for each of the configured DRX cell groups, e.g., in accordance with the DRX configurations for the respective DRX cell groups. Thus, there may be times when both cell groups are in the DRX on state, times when both cell groups are in the DRX off state, and times when one cell group is in the DRX on state while the other is in the DRX off state.

In view of such potential for there to be times when one cell group is in the DRX on state while the other is in the DRX off state, it may be beneficial to support the possibility of dynamic switching between the types of scheduling that could be used for the cells provided to the wireless device. For example, if a cell group is available for scheduling when in the DRX off state via another cell group that is in the DRX on state, this may provide additional flexibility for network scheduling, e.g., compared to if the cell group were only available via same carrier scheduling, at least according to some embodiments. If all cell groups are in the DRX on state, however, it may be beneficial to utilize same carrier scheduling (or "self-scheduling"), as this may entail reduced complexity and/or overhead, e.g., compared to using cross-carrier scheduling, as there may be no need for a carrier indication field (or other mechanism) to indicate for which carrier a downlink control information transmission is intended, at least according to some embodiments. Thus, providing a mechanism to dynamically switch between scheduling schemes may allow for the benefits of both schemes to be realized.

One such mechanism for dynamic switching between scheduling schemes may include use of an explicit indication. According to such a mechanism, the cellular base station may provide an indication to the wireless device of whether a same carrier scheduling scheme or a cross carrier scheduling scheme is activated for each of the cell groups. The wireless device may in turn determine whether to perform control channel decoding for each cell group according to the same carrier scheduling scheme or the cross carrier scheduling scheme, based at least in part on an explicit indication received from the cellular base station.

Another such mechanism for dynamic switching between scheduling schemes may include use of an implicit method of determining which scheduling scheme is activated at any given time, e.g., based on the current DRX state(s) of each of the cell groups. For example, according to such a mechanism, the cellular base station may adhere to a same carrier scheduling scheme when both the first cell group and the second cell group are in a DRX on state, and correspondingly, the wireless device may perform control channel decoding according to the same carrier scheduling scheme when both the first cell group and the second cell group are in a DRX on state. During such times, it may be the case that downlink control information provided to the wireless device does not include a carrier indication field, e.g., since same carrier scheduling may be activated for all cell groups, at least according to some embodiments. Further according to such a scheme, when the first cell group is in a DRX on state and the second cell group is in a DRX off state, the cellular base station may adhere to a same carrier scheduling scheme for the first cell group and a cross carrier scheduling scheme for for the second cell group, and correspondingly, the wireless device may perform control channel decoding for the first cell group according to the same carrier scheduling scheme and control channel decoding for the second cell group according to the cross carrier scheduling scheme. Similarly, when the first cell group is in a DRX off state and the second cell group is in a DRX on state, the cellular base station may adhere to a cross carrier scheduling scheme for the first cell group and a same carrier scheduling scheme for for the second cell group, and correspondingly, the wireless device may perform control channel decoding for the first cell group according to the cross carrier scheduling scheme and control channel decoding for the second cell group according to the same carrier scheduling scheme. During such times, it may be the case that downlink control information provided to the wireless device does include a carrier indication field, e.g., since it may be the case that downlink control information received on a carrier could apply to the same carrier or to a different carrier, at least according to some embodiments.

Note that, at least according to some embodiments, it may be the case that when different cell groups are provided with different CDRX configurations, the wireless device may provide channel state information (CSI) and sounding reference signals (SRS) to the cellular base station independently for the different cell groups, e.g., at least for periodic and/or semi-persistent CSI and SRS transmissions. For example, since the active time for the different cell groups may not necessarily always overlap, supporting independent provision of the CSI and SRS for each cell group may provide more reporting opportunities relative to requiring CSI and SRS to be provided for all cell groups together, at least according to some embodiments.

When carrier aggregation with multiple DRX groups is configured, it may further be the case that techniques for the network to indicate to a wireless device when to start or stop control channel monitoring, and/or to provide commands to enter the DRX off state (e.g., including to stop a DRX inactivity timer), on a per cell group basis, may be supported. For example, layer 1 or layer 2 signaling indications could be used by the cellular base station to provide such indications to the wireless device. Thus, in some instances, the cellular base station may be able to provide an indication to the wireless device to stop control channel monitoring for a specific cell group (e.g., to remain asleep with respect to subsequent CDRX on durations); for example, such an indication could be provided to the wireless device to indicate to stop performing control channel monitoring for the first cell group, such that the indication would not apply to the second cell group. Similarly, the cellular base station may be able to provide an indication to the wireless device to start (e.g., resume) control channel monitoring for a specific cell group (e.g., to wake up for subsequent CDRX on durations); for example, such an indication could be provided to the wireless device to indicate to start performing control channel monitoring for the first cell group, such that the indication would not apply to the second cell group. As a further possibility, the cellular base station may be able to provide an indication to the wireless device to enter the DRX off state for a specific cell group (e.g., to stop the DRX inactivity timer and immediately go to sleep); for example, such an indication could be provided to the wireless device to indicate to enter the DRX off state for the first cell group, such that the indication would not apply to the second cell group. Note that any of various similar such indications, but that apply to all cell groups rather than to only a specific cell group, may also be supported, at least according to some embodiments.

In some embodiments, a wireless device assistance information framework may also be supported in conjunction with the possibility of configuring different cell groups with different DRX configurations. According to the wireless device assistance information framework, it may be the case that the wireless device can provide assistance information to the cellular base station that indicates one or more preferences of the wireless device with respect to the different cell groups and/or the DRX configurations for the different cell groups. The preference information could include information indicating one or more preferred cell groupings, one or more preferred DRX parameters for a specific cell group, and/or any of various other types of preference information for the wireless device. The cellular base station may receive such assistance information, and may determine the cell groups for the wireless device and/or the DRX configuration information for each cell group of the wireless device based at least in part on the assistance information received from the wireless device. Note, though, that at least in some instances, the assistance information may be considered as suggestions rather than requirements, and that the cellular base station may choose to provide DRX configuration information that does or does not correspond to the preference(s) expressed in the assistance information, for example in view of any of various other considerations of the cellular base station.

Thus, using the techniques of FIG. 6, it may be possible for a wireless device to be configured with different DRX configurations for different cell groups in a carrier aggregation scheme. Use of such techniques may result in reduced wireless device power consumption while potentially maintaining network scheduling flexibility, among various other possible effects, at least according to some embodiments.

FIGS. 7-17 and Additional Information

FIGS. 7-17 illustrate further aspects that might be used in conjunction with the method of FIG. 6 if desired. It should be noted, however, that the exemplary details illustrated in and described with respect to FIGS. 7-17 are not intended to be limiting to the disclosure as a whole: numerous variations and alternatives to the details provided herein below are possible and should be considered within the scope of the disclosure.

For RRC connected UEs, for power saving purposes, a discontinuous reception (DRX) mechanism may be configured by the network via dedicated RRC signaling, e.g., in order to control the UE PDCCH monitoring activity in the time domain. When connected DRX (CDRX) is configured, it may be the case that the UE does not have to continuously monitor the PDCCH. At least according to some embodiments, CDRX operation may be characterized by a variety of parameters. One such parameter may include the on-duration, which may be the duration that the UE waits for, after waking up, to receive PDCCH communications. If the UE successfully decodes a PDCCH communication during an on-duration, the UE may stay awake and start an inactivity timer. The inactivity timer may have a specified duration, and until expiry the UE may remain awake and continuously attempt to decode the PDCCH; the inactivity timer may be reset at each successful decoding of a PDCCH communication. Upon expiry, the UE may go back to sleep. At least according to some embodiments, the UE may restart the inactivity timer following a single successful decoding of a PDCCH for a first transmission only (e.g., not for retransmissions).

Another CDRX parameter may include the retransmission timer, which may mark the duration until a retransmission can be expected according to the CDRX configuration. Additionally, the CDRX cycle may specify the periodic repetition of the on-duration followed by a possible period of inactivity. Still further, the total duration that the UE monitors the PDCCH, including the on-duration of the DRX cycle, the time the UE is performing continuous reception while the inactivity timer has not expired, and the time when the UE performing continuous reception while waiting for a retransmission opportunity, may collectively be considered the "active-time". Active-time may also include certain periods for uplink scheduling, including if a scheduling request has been sent on the PUCCH and is pending, and/or during a contention based random access procedure, after the UE receives a Message 2 but does not receive a new dedicated uplink grant. If a UE is not in active time, it may be the case that the UE does not report channel state information (CSI) on the PUCCH or semi-persistent CSI on the PUSCH, and that the UE does not transmit periodic sounding reference signals (SRS) or semi-persistent SRS. The UE may still be allowed to transmit aperiodic CSI and SRS outside of active time.

Figure 7:
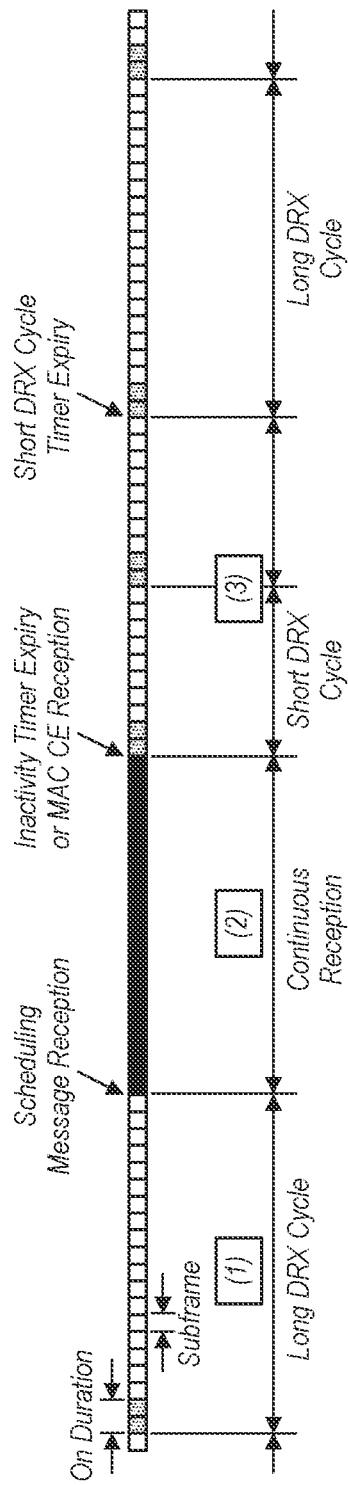
FIG. 7 is a timing diagram illustrating aspects of an exemplary possible period of time in which CDRX is configured for a UE, according to some embodiments.

FIG. 7 is a timing diagram illustrating aspects of an exemplary possible period of time in which CDRX is configured for a UE, according to some embodiments. As shown, in the illustrated scenario, the UE may initially monitor the PDCCH for an on duration period, followed by a period of inactivity for the remainder of a long DRX cycle. In the next on duration period, the UE may receive a scheduling message, which may trigger a period of continuous reception, until the DRX inactivity timer expires or a MAC CE indicating to enter DRX off is received. The UE may then resume DRX operation with short DRX cycles until the short DRX cycle timer expires, after which the UE may perform DRX operation with long DRX cycles.

Figure 8:
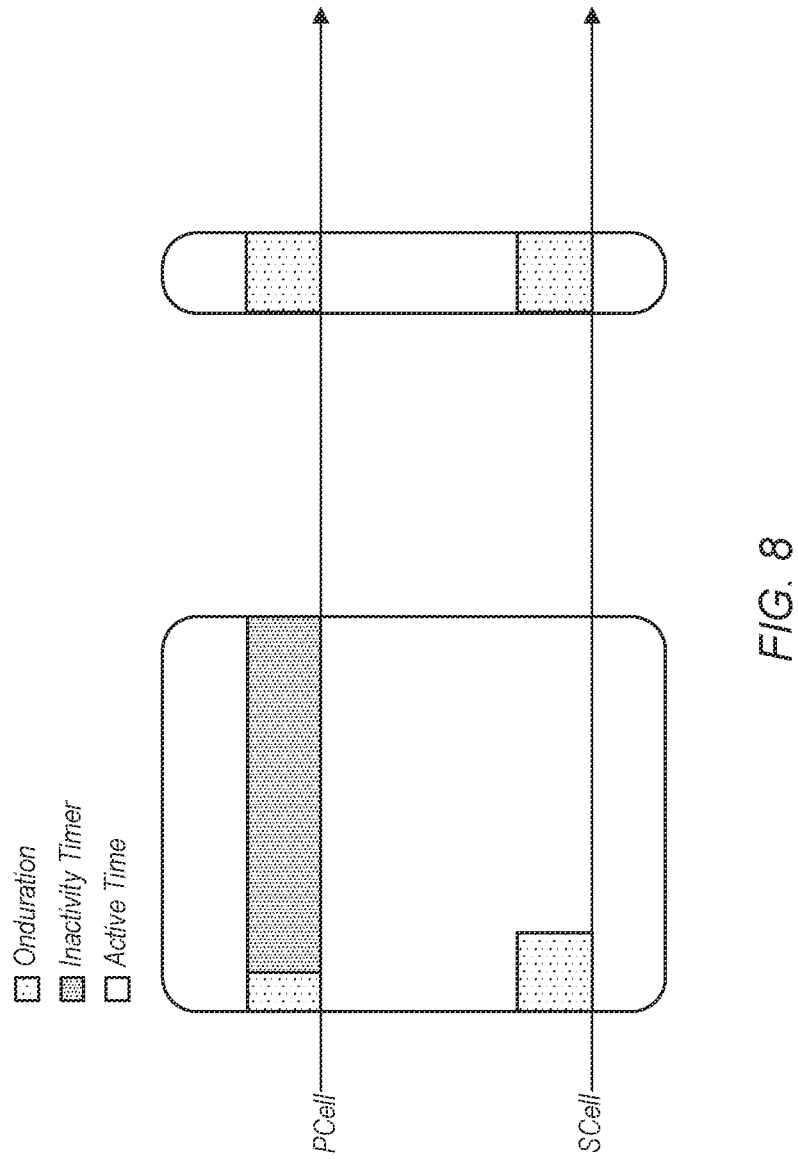
FIG. 8 illustrates aspects of an exemplary possible approach to performing CDRX operation in a carrier aggregation scenario, according to some embodiments.
Figure 9:
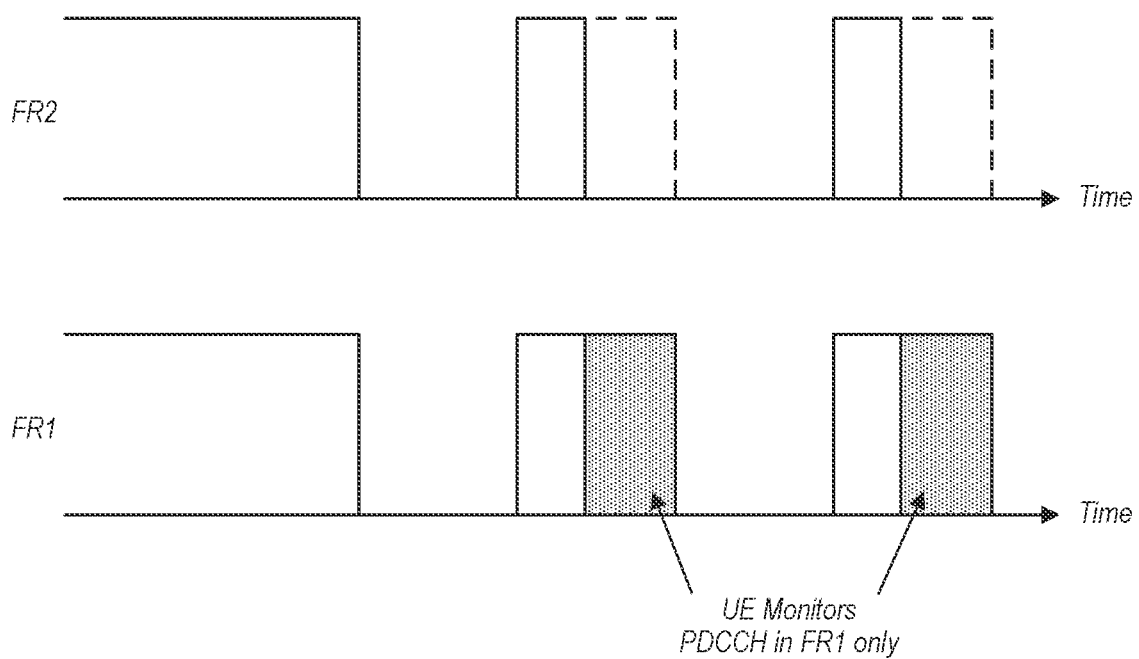
FIG. 9 is a timing diagram illustrating aspects of an exemplary possible scenario in which PDCCH monitoring may take longer in one frequency range than in another frequency range, according to some embodiments.

In the case of carrier aggregation (CA), it may be the case that the network provides one DRX configuration to a UE, and that the UE maintains common active time across all of the CA serving cells. Thus, if the UE is required to monitor the PDCCH on any serving cell, the UE may wakeup and perform PDCCH monitoring on all activated cells. Aspects of such an approach to performing CDRX in CA are illustrated in FIG. 8, according to some embodiments. In the illustrated scenario, a UE may be configured with a PCell and a SCell, and may remain active with respect to the Scell for the duration of an inactivity timer on the PCell even if no signaling is received during the on duration portion on the SCell.

It may be the case that the network configures the CDRX configuration according to potential PDCCH scheduling opportunities. However, for the same PDCCH scheduling opportunities, the period for different subcarrier spacing configurations may be different. For example, consider a 3GPP frequency range 1 (FR1)+frequency range 2 (FR2) CA configuration in 5G NR, in which a primary cell (PCell) is configured in FR1 with SCS of 15 kHz and a secondary cell (SCell) is configured in FR2 with SCS of 120 kHz. In such a scenario, the amount of time to monitor the PDCCH for a PDCCH scheduling opportunity may be longer for FR1 than for FR2, such as in the scenario illustrated in FIG. 9. However, if the UE maintains common active time across all of the CA serving cells, the UE may have unnecessary UE power consumption on FR2, since the UE has to remain awake on any FR2 serving cells because the potential scheduling period on FR1 is longer than that on FR2.

According to some embodiments, it may thus be possible that providing separate DRX configurations and separating active time for FR1 and FR2 (or otherwise separating cells or cell groups of a CA configuration) can help reduce UE power consumption and/or reduce the impact to network scheduler flexibility. For example, a shorter inactivity timer and shorter on duration could be configured for a cell in FR2 than in FR1, as one possibility, to reduce UE power consumption, at least according to some embodiments. However, such separate DRX configurations could lead to a UE having a different DRX on/off state on FR1 and FR2 serving cells, such that the network may not be able to schedule on one of those resources (FR1 or FR2), and may have to wait until the next on duration when scheduling opportunities are available in both FR1 and FR2, at least according to some embodiments.

In order to provide support for such a multiple DRX configuration feature, a mechanism may be provided for a UE to report its capability to support the multiple DRX configuration feature. If the UE is capable of supporting multiple DRX configurations in CA (e.g., and reports as much to the network), the network may choose to provide multiple DRX configurations in CA, and the UE may maintain the potentially different DRX on/off states for each of the different serving cells. The multiple DRX configurations can be serving cell specific, or FR1/FR2 specific, or DRX group specific, or may be provided in any of various other possible ways.

The UE may operate on each of the different serving cells in accordance with the (potentially different) DRX state of each such cell, e.g., such that the UE may only monitor the PDCCH of the PDCCH cell according to the active time of that PDCCH cell. For one DRX group, it may be the case that the UE reports the CSI for the serving cells and transmits SRS on the serving cells belonging to the DRX group only when the DRX group is in active time/the DRX on state. The CSI mask can be configured per DRX group, and/or the wakeup signal (WUS) can be per DRX group. For one DRX group, it could be configured with both a self-scheduling scheme and a cross-carrier scheduling scheme, and one of the schemes could be selected/activated at a time. The scheduling scheme switching can be explicitly indicated by the network or implicitly based on the DRX group's DRX state.

The network may indicate to the UE to start or stop PDCCH monitoring on one or more serving cells/DRX groups/frequency ranges via L1 or L2 signaling. As one possibility, a "Type 1" DRX MAC CE may indicate to a UE to enter the DRX off state on all serving cells. It may be the case that an existing DRX MAC CE can be used for this purpose, at least according to some embodiments. As another possibility, a "Type 2" DRX MAC CE may indicate, for one particular serving cell/DRX group/frequency range, to enter the DRX off state. Note additionally that UE assistance information (e.g., regarding a preferred DRX configuration or set of DRX configurations) could be provided on a per serving cell/per DRX group/per frequency range basis.

Figure 10:
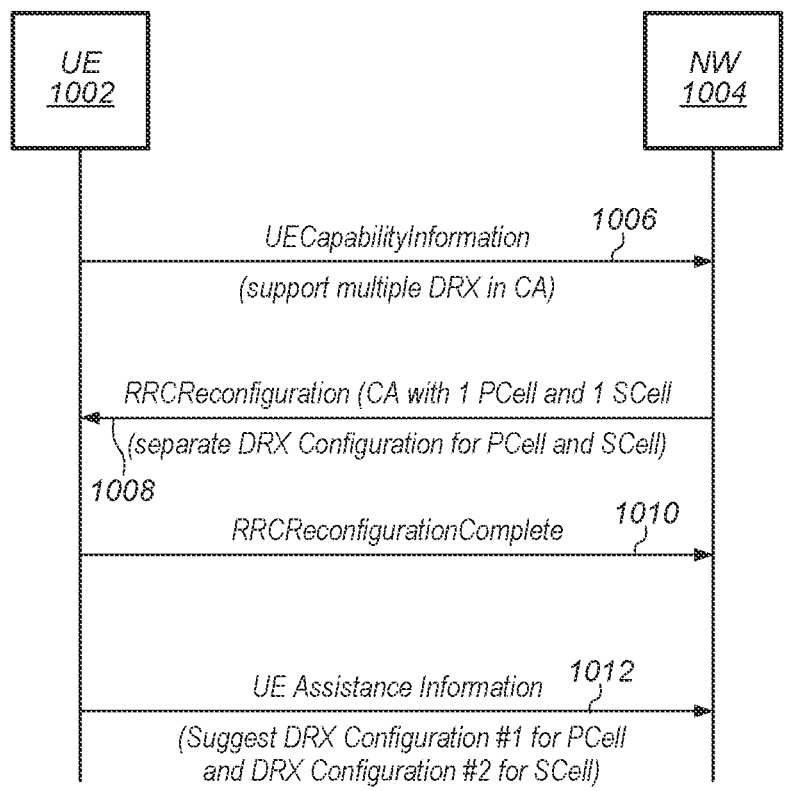
FIG. 10 is a communication flow diagram illustrating a possible RRC signaling flow between a UE and a network to support multiple DRX configuration in CA, according to some embodiments.

FIG. 10 is a communication flow diagram illustrating a possible RRC signaling flow between a UE 1002 and a network 1004 to support multiple DRX configuration in CA, according to some embodiments. As shown, in 1006, the UE may report its capability regarding support for the multiple DRX configuration feature. The capability information could include whether the UE supports separate DRX configuration and/or separate DRX parameters, whether the UE supports per cell (or cell group or frequency range) DRX MAC CEs, whether the UE supports cross cell/group PDCCH monitoring, whether the UE supports scheduling scheme switching, and/or any of various other multiple DRX configuration capability related information.

In 1008, the network may provide configuration information configuring CA with multiple DRX configurations, for example potentially including separate DRX configurations for a primary cell and a secondary cell. As previously noted herein, the DRX configuration can be serving cell specific, or FR1/FR2 specific, or DRX group specific, among various possibilities. The separate DRX configurations could include different inactivity timers, different on durations, different short DRX cycles, different short DRX timers, different long DRX cycles, different hybrid automatic repeat request (HARM) round trip time (RTT) and/or retransmission timers, and/or differences between any of various other possible CDRX parameters. In 1010, the UE may confirm the configuration. Once configured, the UE may maintain the different DRX on/off states for the different cells of the CA configuration.

In 1012, the UE may provide UE assistance information regarding the DRX configuration. Such information could be provided per serving cell/DRX group/frequency range, for example such that different DRX configurations could be suggested for the primary cell and the secondary cell.

Figure 11:
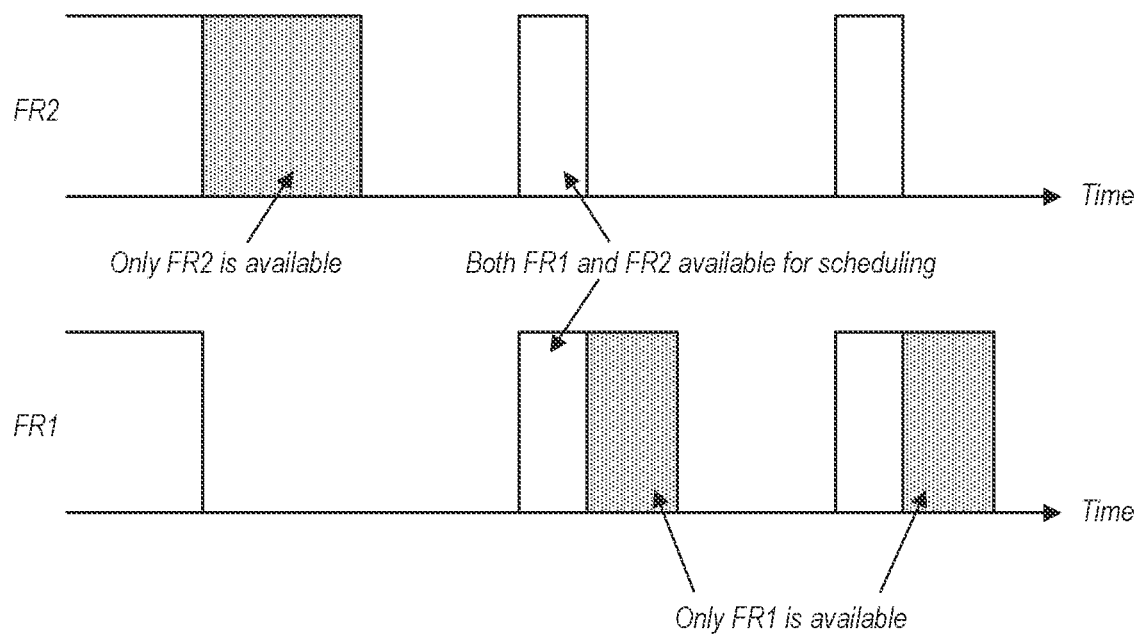
FIG. 11 illustrates aspects of possible UE operation in various state combinations, according to some embodiments, in an exemplary scenario in which FR1 and FR2 cells in a CA configuration have different CDRX configurations.

When multiple DRX configurations are used, such that different cells may have different DRX configurations, there may be several possible combinations of ON/OFF states for the different cells, with potentially different UE behavior for each such combination of states. FIG. 11 illustrates aspects of possible UE operation in various such state combinations, according to some embodiments, in an exemplary scenario in which FR1 and FR2 cells in a CA configuration have different CDRX configurations.

When the (FR1 state, FR2 state)=(ON, ON), it may be the case that the UE monitors both the search space (SS) configured in FR1 and the SS configured in FR2. The network may be able to use both FR1 and FR2 time and frequency resources for data scheduling, and same carrier scheduling may be supported.

When the (FR1 state, FR2 state)=(ON, OFF), it may be the case that the UE monitors the SS configured for FR1 only. The network may be able to use only the FR1 time and frequency resources for data scheduling, but cross carrier scheduling for FR2 may be supported.

When the (FR1 state, FR2 state)=(OFF, ON), it may be the case that the UE monitors the SS configured for FR2 only. The network may be able to use only the FR2 time and frequency resources for data scheduling, but cross carrier scheduling for FR1 may be supported.

When the (FR1 state, FR2 state)=(OFF, OFF), it may be the case that the UE does not monitor either of the FR1 or FR2 cells.

Figure 12:
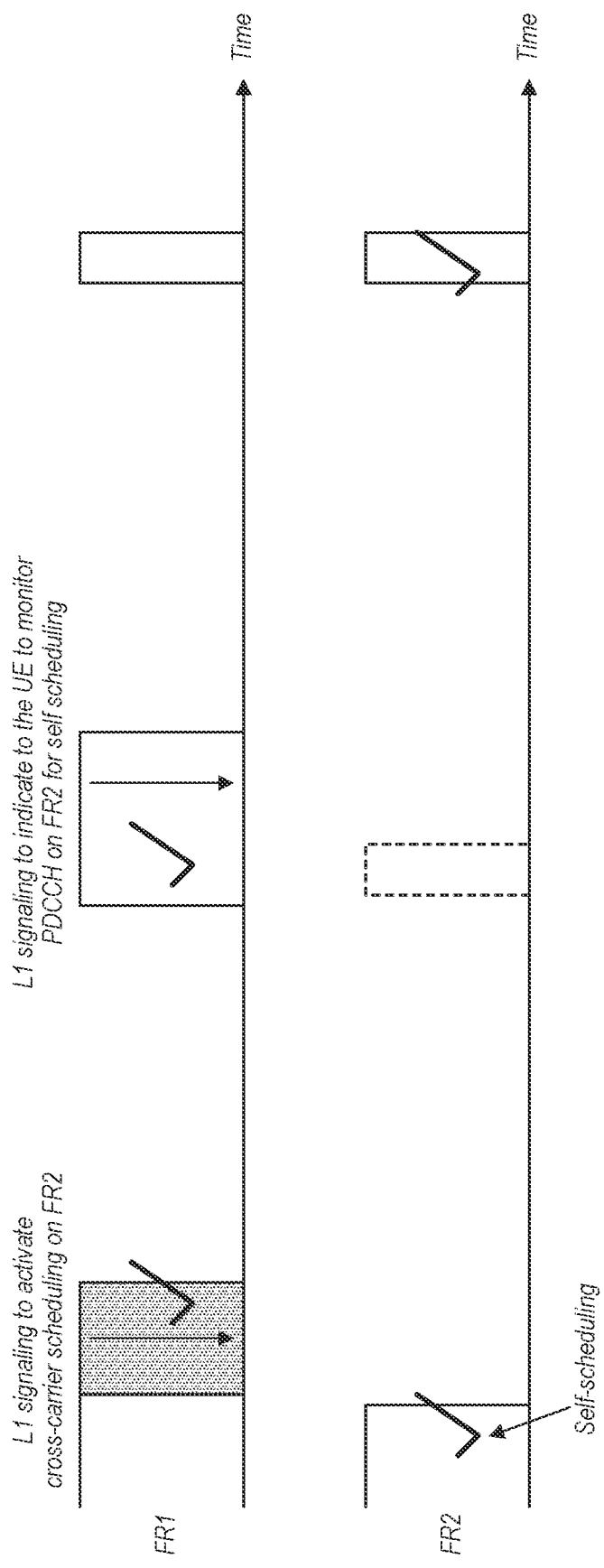
FIG. 12 illustrates aspects of an exemplary possible explicit scheduling switching approach that could be used in conjunction with multiple DRX configuration in CA, according to some embodiments.

The network may be able to configure both a self-scheduling scheme and a cross-carrier scheduling scheme for one serving cell, and may be able to switch scheduling schemes, in conjunction with multiple DRX configuration operation, according to some embodiments. There may be multiple options for determining the scheduling scheme selection for an active serving cell. As one possibility, the scheduling scheme switching can be explicitly indicated by the network, e.g., via L1 or L2 signaling. For example, FIG. 12 illustrates aspects of one such exemplary explicit scheduling switching approach, according to some embodiments. As shown, in the illustrated scenario, initially, a cell on FR2 may be configured for self-scheduling. L1 signaling may then be provided on a cell on FR1 to activate cross-carrier scheduling on the cell on FR2. In the next scheduled on duration of the cell on FR2, the UE may not monitor the PDCCH on the cell on FR2 based on cross carrier scheduling having been activated. L1 signaling may then be provided to indicate to the UE to monitor the PDCCH on FR2 for self scheduling, based on which the UE may monitor the PDCCH on the cell on FR2 at the next scheduled on duration of the cell on FR2.

Figure 13:
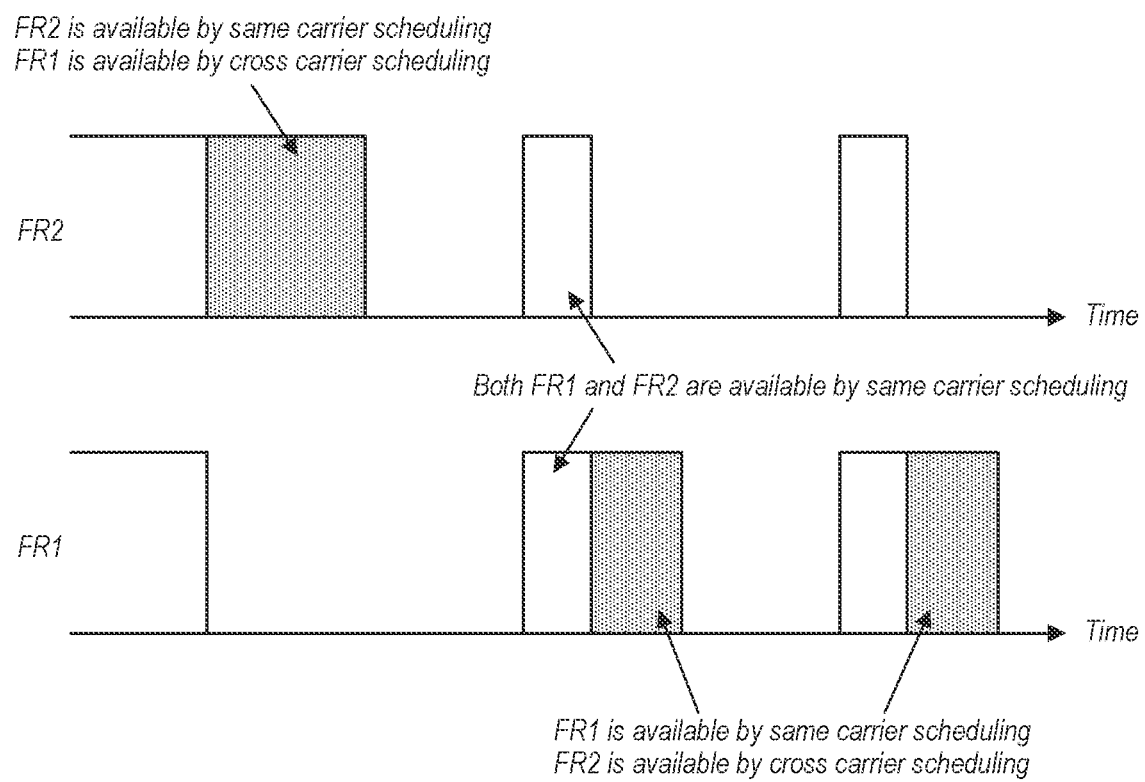
FIGS. 13-15 illustrate aspects of an exemplary possible implicit scheduling switching approach that could be used in conjunction with multiple DRX configuration in CA, according to some embodiments.
Figure 14:
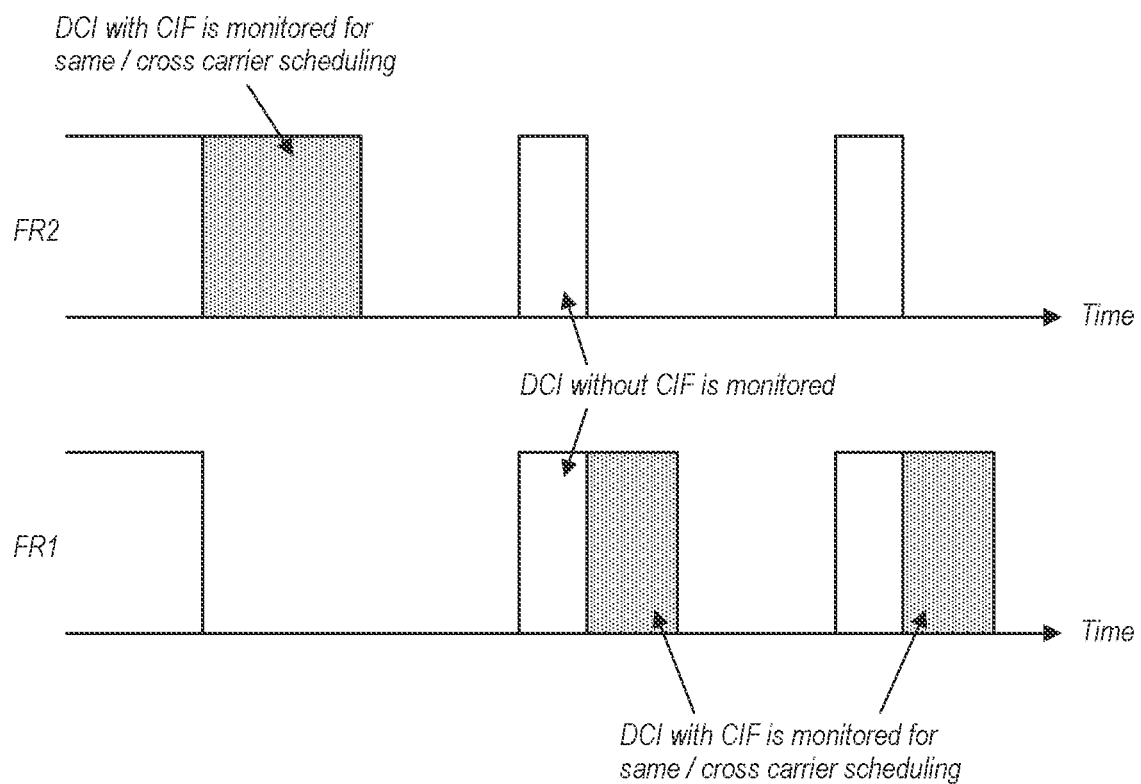
Figure 15:
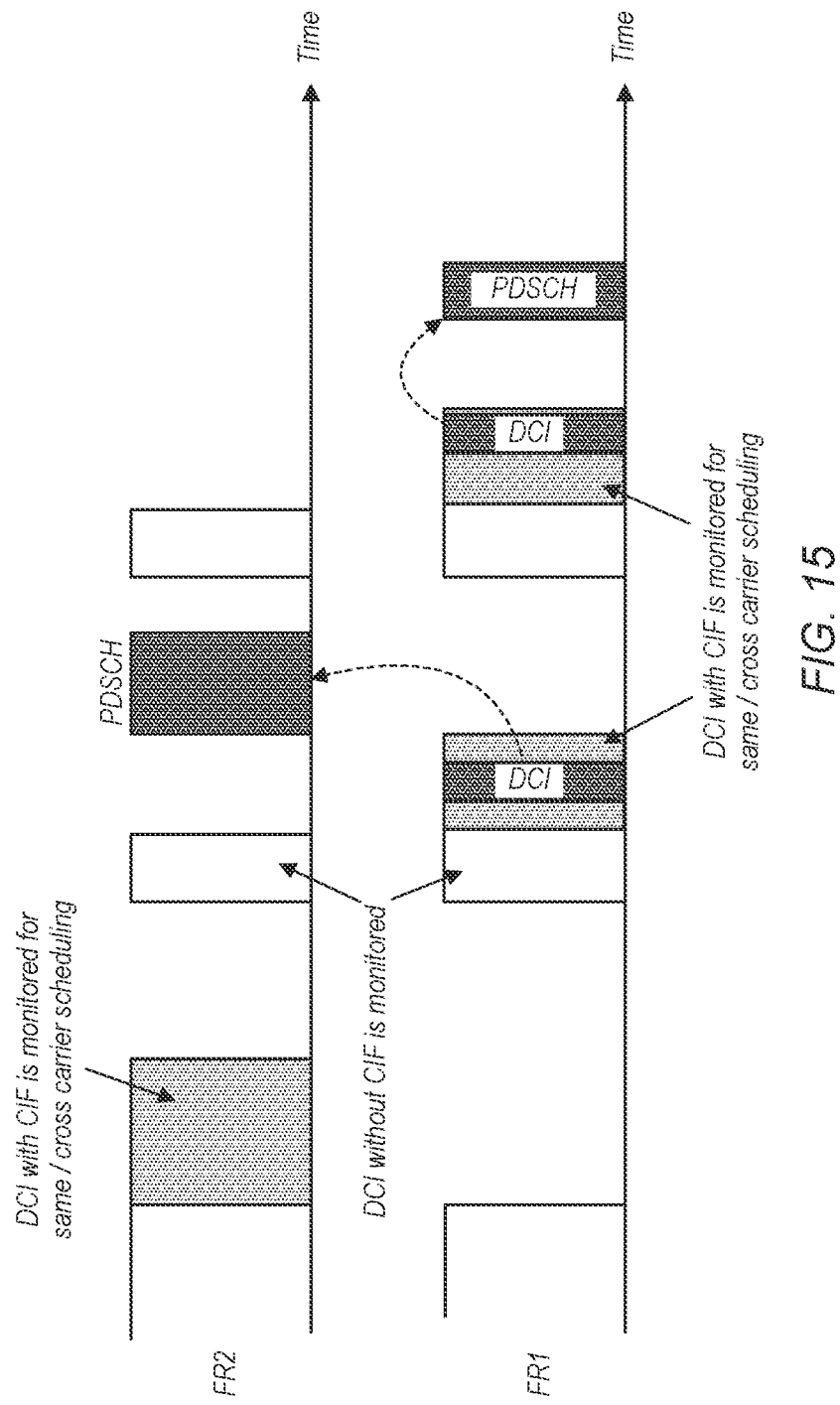

As another possibility, the scheduling scheme switching can be performed implicitly, e.g., based on the serving cell's DRX state. FIGS. 13-15 illustrate aspects of one such exemplary implicit scheduling switching approach, according to some embodiments. According to such a scheme, self scheduling or cross carrier scheduling may be enabled depending on the state of each cell. If a cell goes to the OFF state, then cross carrier scheduling may be used in associated cell(s). To support such cross carrier scheduling, it may be the case that a carrier indication field (CIF) is included in DCI that could be used for cross carrier scheduling. This field may indicate which cell is scheduled for PDSCH/PUSCH communication. Note that inclusion of this field may require a DCI size change, e.g., relative to DCI that does not include CIF information. Additionally, a cell may need to provide SS for the UE to monitor the PDCCH for cross carrier scheduling to be performed.

When performing PDCCH monitoring when such dynamic scheduling scheme switching based on DRX state changes is configured, the UE may monitor the PDCCH in the configured search space(s), where each SS has a certain set of DCI formats and sizes for it. The DCI size may be determined by the DCI format and supported features. It may be the case that required fields are included in the related DCI formats. In certain 3GPP release versions (e.g., R15), it may be the case that once cross carrier scheduling is enabled, then the CIF field is always included in DCI. For a dynamic scheduling scheme switching approach based on DRX state changes, it may be the case that the CIF is included (or not included) dynamically based on the scheduling availability of cells. For example, if a cell is not available for same carrier scheduling, then cross carrier scheduling may automatically be enabled in another (e.g., available) cell (or associated cell).

Figure 16:
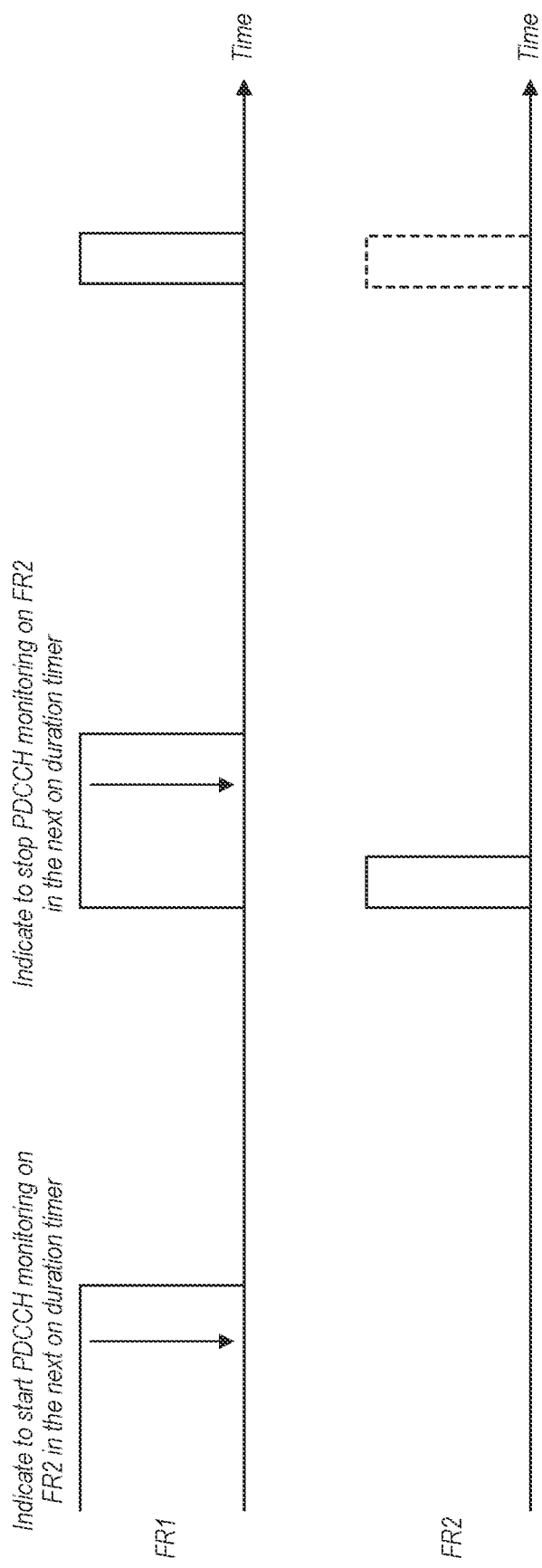
FIG. 16 illustrates aspects of an exemplary mechanism for a network to indicate to start or stop PDCCH monitoring for a given frequency range in the next on duration timer in a scenario in which FR1 and FR2 have different CDRX configurations, according to some embodiments.

It may also be possible for the network to indicate to a UE to start or stop PDCCH monitoring on one serving cell/DRX group/frequency range, e.g., via L1 or L2 signaling. FIG. 16 illustrates aspects of such an exemplary mechanism for the network to indicate to start or stop PDCCH monitoring for a given frequency range in the next on duration timer in a scenario in which FR1 and FR2 have different CDRX configurations, according to some embodiments. In the illustrated scenario, the network may provide an indication (via FR1) to start PDCCH monitoring on FR2 in the next on duration for FR2, based on which the UE may monitor the PDCCH on FR2 in the next on duration for FR2. Subsequently, the network may provide an indication (via FR1) to stop PDCCH monitoring on FR2, based on which the UE may not monitor the PDCCH on FR2 in the subsequent on duration for FR2. Note that such indications could be provided in active time (e.g., as shown) or not active time (e.g., using a wake up signal), according to various embodiments. Note further that the network may also be able to provide indications to a UE to start or stop PDCCH monitoring on all serving cells, at least in some embodiments.

Figure 17:
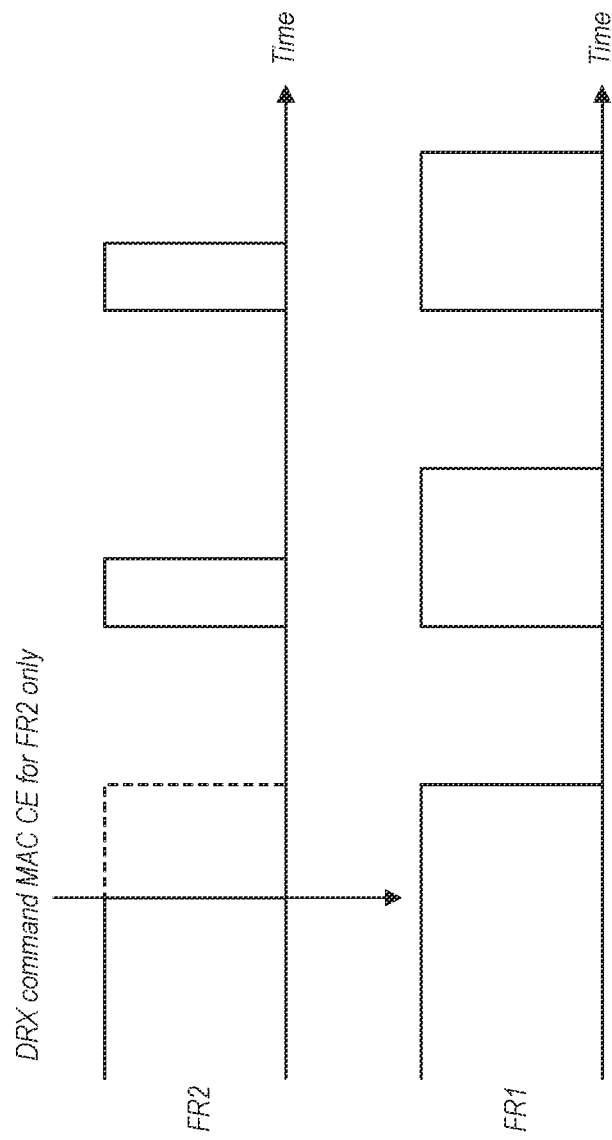
FIG. 17 illustrates aspects of an exemplary mechanism for a network to indicate to stop inactivity timer operation on a per frequency range basis, according to some embodiments.

Similarly, it may be possible for the network to indicate to a UE to stop UE inactivity timer operation (e.g., to immediately enter DRX off state) on one serving cell/DRX group/frequency range, e.g., via L1 or L2 signaling. FIG. 17 illustrates aspects of such an exemplary mechanism for the network to indicate to stop inactivity timer operation on a per frequency range basis, according to some embodiments. In the illustrated scenario, the network may provide an indication (e.g., a DRX command MAC CE) to stop UE inactivity timer operation and enter the DRX off state on FR2 only, based on which the UE may stop UE inactivity timer operation and enter the DRX off state on FR2 while continuing UE inactivity timer operation and remaining in the DRX on state on FR1.

In the following further exemplary embodiments are provided.

One set of embodiments may include an apparatus, comprising: a processor configured to cause a wireless device to: provide an indication that the wireless device supports multiple discontinuous reception (DRX) configurations for carrier aggregation operation to a cellular base station; and receive configuration information for carrier aggregation operation from the cellular base station, wherein the configuration information includes a first DRX configuration for a first cell group, wherein the configuration information further includes a second DRX configuration for a second cell group, wherein at least one DRX parameter differs between the first DRX configuration and the second DRX configuration.

According to some embodiments, the processor is further configured to cause the wireless device to: determine whether to operate in a DRX on or DRX off state independently for each of the first cell group and the second cell group.

According to some embodiments, the processor is further configured to cause the wireless device to: perform physical downlink control channel (PDCCH) decoding according to a same carrier scheduling scheme when both the first cell group and the second cell group are in a DRX on state.

According to some embodiments, the processor is further configured to cause the wireless device to: perform physical downlink control channel (PDCCH) decoding for the first cell group according to a same carrier scheduling scheme and performing PDCCH decoding for the second cell group according to a cross carrier scheduling scheme when the first cell group is in a DRX on state and the second cell group is in a DRX off state; and perform PDCCH decoding for the first cell group according to a cross carrier scheduling scheme and performing PDCCH decoding for the second cell group according to a same carrier scheduling scheme when the first cell group is in a DRX off state and the second cell group is in a DRX on state.

According to some embodiments, the first cell group includes at least one cell in a first frequency range, wherein the second cell group includes at least one cell in a second frequency range, wherein the first frequency range and the second frequency range are non-contiguous.

According to some embodiments, the processor is further configured to cause the wireless device to: transmit channel state information (CSI) and sounding reference signals (SRS) independently for each of the first cell group and the second cell group.

Another set of embodiments may include a wireless device, comprising: at least one antenna; at least one radio coupled to the at least one antenna; and a processor coupled to the at least one radio; wherein the wireless device is configured to: provide an indication that the wireless device supports multiple discontinuous reception (DRX) configurations for carrier aggregation operation to a cellular base station; and receive configuration information for carrier aggregation operation from the cellular base station, wherein the configuration information includes separate DRX configurations for each of at least a first cell group and a second cell group.

According to some embodiments, the wireless device is further configured to: determine whether to perform physical downlink control channel (PDCCH) decoding for each of the first cell group and the second cell group according to a same carrier scheduling scheme or a cross carrier scheduling scheme based at least in part on a current DRX state of the first cell group and the second cell group.

According to some embodiments, the wireless device is further configured to: search for downlink control information (DCI) that has a DCI format that does not include a carrier indication field when performing PDCCH decoding for both the first cell group and the second cell group according to the same carrier scheduling scheme; and search for DCI that has a DCI format that does include a carrier indication field when performing PDCCH decoding for at least one of the first cell group or the second cell group according to the cross carrier scheduling scheme.

According to some embodiments, the wireless device is further configured to: determine whether to perform physical downlink control channel (PDCCH) decoding for each of the first cell group and the second cell group according to a same carrier scheduling scheme or a cross carrier scheduling scheme based at least in part on an explicit indication received from the cellular base station.

According to some embodiments, the wireless device is further configured to: receive an indication from the cellular base station to stop PDCCH monitoring for the first cell group, wherein the indication does not apply to the second cell group.

According to some embodiments, the wireless device is further configured to: receive an indication from the cellular base station to start PDCCH monitoring for the first cell group immediately or according to the first DRX configuration, wherein the indication does not apply to the second cell group.

According to some embodiments, the wireless device is further configured to: receive an indication from the cellular base station to enter a DRX off state for the first cell group, wherein the indication does not apply to the second cell group.

According to some embodiments, the wireless device is further configured to: provide wireless device assistance information to the cellular base station, wherein the wireless device assistance information indicates one or more preferred DRX parameters for one or more of the first cell group or the second cell group.

Yet another set of embodiments may include a cellular base station, comprising: at least one antenna; at least one radio coupled to the at least one antenna; and a processor coupled to the at least one radio; wherein the cellular base station is configured to: receive an indication from a wireless device that the wireless device supports multiple discontinuous reception (DRX) configurations for carrier aggregation operation; and provide configuration information for carrier aggregation operation to the wireless device, wherein the configuration information includes separate DRX configurations for each of at least a first cell group and a second cell group.

According to some embodiments, the cellular base station is further configured to: receive wireless device assistance information, wherein the wireless device assistance information indicates one or more preferred DRX parameters for one or more of the first cell group or the second cell group; and determine the DRX configurations for the wireless device based at least in part on the wireless device assistance information.

According to some embodiments, the cellular base station is further configured to: provide an indication to the wireless device of whether a same carrier scheduling scheme or a cross carrier scheduling scheme is activated for each of the first cell group and the second cell group.

According to some embodiments, the cellular base station is further configured to: determine whether to schedule each of the first cell group and the second cell group according to a same carrier scheduling scheme or a cross carrier scheduling scheme based at least in part on a current DRX state of the first cell group and the second cell group.

According to some embodiments, the cellular base station is further configured to: provide scheduling information to the wireless device using a scheduling information format that does not include a carrier indication field when both of the first cell group and the second cell group are scheduled according to a same carrier scheduling scheme; and provide scheduling information to the wireless device using a scheduling information format that does include a carrier indication field when at least one of the first cell group and the second cell group are scheduled according to a cross carrier scheduling scheme.

According to some embodiments, the cellular base station is further configured to: provide an indication to the wireless device to stop PDCCH monitoring for a specific cell group.

According to some embodiments, the cellular base station is further configured to: provide an indication to the wireless device to start PDCCH monitoring for a specific cell group.

According to some embodiments, the cellular base station is further configured to: provide an indication to the wireless device to enter a DRX off state for a specific cell group.

Another exemplary embodiment may include a device, comprising: an antenna; a radio coupled to the antenna; and a processing element operably coupled to the radio, wherein the device is configured to implement any or all parts of the preceding examples.

Yet another exemplary embodiment may include a method, comprising: by a device: performing any or all parts of the preceding examples.

A yet further exemplary embodiment may include a non-transitory computer accessible memory medium comprising program instructions which, when executed at a device, cause the device to implement any or all parts of any of the preceding examples.

A still further exemplary embodiment may include a computer program comprising instructions for performing any or all parts of any of the preceding examples.

Yet another exemplary embodiment may include an apparatus comprising means for performing any or all of the elements of any of the preceding examples.

Still another exemplary embodiment may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processor configured to, when executing instructions stored in a memory, perform operations comprising:
providing, to a cellular base station, an indication that a wireless device supports multiple discontinuous reception (DRX) configurations for carrier aggregation; and
receiving, from the cellular base station, configuration information for carrier aggregation operation comprising:
a first DRX configuration for a first cell group served by the cellular base station and belonging to a first frequency range, the first DRX configuration comprising at least one first DRX parameter; and
a second DRX configuration for a second cell group served by the cellular base station and belonging to a second frequency range, the second DRX configuration comprising at least one second DRX parameter distinct from the at least one first DRX parameter;
receiving a medium access control-control element (MAC-CE) indicating for the wireless device to stop respective DRX inactivity timers for the respective first and second cell groups; and
stopping, based at least in part on the received configuration information and MAC-CE, the respective DRX inactivity timers for the respective first and second cell groups.

2. The apparatus of claim 1, wherein the operations further comprise:
determining whether to operate in a DRX on or DRX off state independently for each of the first cell group and the second cell group.

3. The apparatus of claim 1, wherein the operations further comprise:
performing physical downlink control channel (PDCCH) decoding according to a same carrier scheduling scheme when both the first cell group and the second cell group are in a DRX on state.

4. The apparatus of claim 1, wherein the operations further comprise:
performing physical downlink control channel (PDCCH) decoding for the first cell group according to a same carrier scheduling scheme and performing PDCCH decoding for the second cell group according to a cross carrier scheduling scheme when the first cell group is in a DRX on state and the second cell group is in a DRX off state; and
performing PDCCH decoding for the first cell group according to a cross carrier scheduling scheme and performing PDCCH decoding for the second cell group according to a same carrier scheduling scheme when the first cell group is in a DRX off state and the second cell group is in a DRX on state.

5. The apparatus of claim 1,
wherein the first cell group includes at least one cell in the first frequency range,
wherein the second cell group includes at least one cell in the second frequency range,
wherein the first frequency range and the second frequency range are non-contiguous.

6. The apparatus of claim 1, wherein the operations further comprise:
transmitting channel state information (CSI) and sounding reference signals (SRS) independently for each of the first cell group and the second cell group.

7. A method, comprising:
providing, to a cellular base station, an indication that a wireless device supports multiple discontinuous reception (DRX) configurations for carrier aggregation operation;
receiving, from the cellular base station, configuration information for carrier aggregation operation comprising:
a first DRX configuration for a first cell group served by the cellular base station and belonging to a first frequency range, the first DRX configuration comprising at least one first DRX parameter; and
a second DRX configuration for a second cell group served by the cellular base station and belonging to a second frequency range, the second DRX configuration comprising at least one second DRX parameter distinct from the at least one first DRX parameter;
receiving a medium access control-control element (MAC-CE) indicating for the wireless device to stop respective DRX inactivity timers for the respective first and second cell groups; and stopping, based at least in part on the received configuration information and MAC-CE, the respective DRX inactivity timers for the respective first and second cell groups.

8. The method of claim 7, further comprising:
determining whether to perform physical downlink control channel (PDCCH) decoding for each of the first cell group and the second cell group according to a same carrier scheduling scheme or a cross carrier scheduling scheme based at least in part on a current DRX state of the first cell group and the second cell group.

9. The method of claim 8, further comprising:
searching for downlink control information (DCI) that has a DCI format that does not include a carrier indication field when performing PDCCH decoding for both the first cell group and the second cell group according to the same carrier scheduling scheme; and
searching for DCI that has a DCI format that does include a carrier indication field when performing PDCCH decoding for at least one of the first cell group or the second cell group according to the cross carrier scheduling scheme.

10. The method of claim 7, further comprising:
determining whether to perform physical downlink control channel (PDCCH) decoding for each of the first cell group and the second cell group according to a same carrier scheduling scheme or a cross carrier scheduling scheme based at least in part on an explicit indication received from the cellular base station.

11. The method of claim 7, further comprising:
receiving another indication from the cellular base station to stop PDCCH monitoring for the first cell group, wherein the indication does not apply to the second cell group.

12. The method of claim 11, further comprising:
receiving a different indication from the cellular base station to start PDCCH monitoring for the first cell group immediately or according to the first DRX configuration, wherein the different indication does not apply to the second cell group.

13. The method of claim 7, further comprising:
providing wireless device assistance information to the cellular base station, wherein the wireless device assistance information indicates one or more preferred DRX parameters for one or more of the first cell group or the second cell group.

14. A method, comprising:
receiving, from a wireless device, an indication that the wireless device supports multiple discontinuous reception (DRX) configurations for carrier aggregation operation;
providing, to the wireless device, configuration information for carrier aggregation operation comprising:
a first DRX configuration for a first cell group served by a cellular base station and belonging to a first frequency range, the first DRX configuration comprising at least one first DRX parameter; and
a second DRX configuration for a second cell group served by the cellular base station and belonging to a second frequency range, the second DRX configuration comprising at least one second DRX parameter distinct from the at least one first DRX parameter; and
providing, to the wireless device, a medium access control-control element (MAC-CE) indicating for the wireless device to stop respective DRX inactivity timers for the respective first and second cell groups.

15. The method of claim 14, further comprising:
receiving wireless device assistance information, wherein the wireless device assistance information indicates one or more preferred DRX parameters for one or more of the first cell group or the second cell group; and
determining the DRX configurations for the wireless device based at least in part on the wireless device assistance information.

16. The method of claim 14, further comprising:
providing another indication to the wireless device of whether a same carrier scheduling scheme or a cross carrier scheduling scheme is activated for each of the first cell group and the second cell group.

17. The method of claim 14, further comprising:
determining whether to schedule each of the first cell group and the second cell group according to a same carrier scheduling scheme or a cross carrier scheduling scheme based at least in part on a current DRX state of the first cell group and the second cell group.

18. The method of claim 17, further comprising:
providing scheduling information to the wireless device using a scheduling information format that does not include a carrier indication field when both of the first cell group and the second cell group are scheduled according to a same carrier scheduling scheme; and
providing scheduling information to the wireless device using a scheduling information format that does include a carrier indication field when at least one of the first cell group and the second cell group are scheduled according to a cross carrier scheduling scheme.

19. The method of claim 14, further comprising:
providing a different indication to the wireless device to start PDCCH monitoring for a specific cell group.

20. The method of claim 14, further comprising:
providing a different indication to the wireless device to enter a DRX off state for a specific cell group.

* * * * *